United States Patent
Slemcu et al.

(10) Patent No.: US 7,401,653 B2
(45) Date of Patent: Jul. 22, 2008

(54) SUBSTANCES TO STIMULATE THE EXTRACTION OF CRUDEOIL AND A METHOD OF PROCESSING THEM

(76) Inventors: Nicolae Slemcu, Aleea Postavarul nr. 2D, bl.C4B, sc.A.,ap.9, sector 3, Bucharest (RO); Mircea Ioan Razvan Vasiliu, Bdul. Unirii nr. 33, bl A2, s. 2, ap. 37, sector 3, Bucharest (RO); Cristian Dragos Toanchina, Bdul. Ion C. Bratianu nr. 6, ap. 9bis, sector 3, Bucharest (RO)

( * ) Notice: Subject to any disclaimer, the term of this patent is extended or adjusted under 35 U.S.C. 154(b) by 218 days.

(21) Appl. No.: 10/559,585

(22) PCT Filed: Apr. 5, 2004

(86) PCT No.: PCT/RO2004/000008
§ 371 (c)(1),
(2), (4) Date: Dec. 2, 2005

(87) PCT Pub. No.: WO2004/111383
PCT Pub. Date: Dec. 23, 2004

(65) Prior Publication Data
US 2006/0113076 A1 Jun. 1, 2006

(30) Foreign Application Priority Data
Jun. 13, 2003 (RO) ............................ 2003-00519

(51) Int. Cl.
*E21B 43/22* (2006.01)
(52) U.S. Cl. ............... 166/310; 166/263; 166/279; 166/300; 166/371

(58) Field of Classification Search .................. None
See application file for complete search history.

(56) References Cited

U.S. PATENT DOCUMENTS 3,276,519 A * 10/1966 Knox et al. ................. 166/279
3,730,273 A * 5/1973 Wilson ........................ 166/269
4,541,937 A * 9/1985 Morduchowitz et al. .... 507/254

FOREIGN PATENT DOCUMENTS
EP 0 737 798 10/1996

* cited by examiner

*Primary Examiner*—Zakiya W. Bates
(74) *Attorney, Agent, or Firm*—Andrew Wilford; Jonathan Myers

(57) ABSTRACT

Substances to stimulate the extraction of crude oil and a method, of processing them: This invention is about substances to stimulate the extraction of crude oils, especially the ponderous and paraffin one, not clogging the route and the abutting deposits of the oil derrick by changing the deposit's reology and also about solubility of the aggregates which were made from paraffin resins on the oil derrick's circulation route, using a similar chemical vector to the prodrugs from the medicine industry. The substance to stimulate the extraction of crude oil by increasing the fluidization characterized by the fact that 90% from the volume is made by mixing three fractions oil types from the distilled mineral coal: −20-30% phenol oil (fraction distilled from 170-190° C.); −20-40% absorption oil (fraction distilled from 250-270° C.); −20-40% polymerized oil (fraction distilled from 320-350° C.); which is called chemical vector and till 100% is completing itself with organic reactive like solvents, active-tensioned substances, generating gas substances.

10 Claims, No Drawings

SUBSTANCES TO STIMULATE THE EXTRACTION OF CRUDEOIL AND A METHOD OF PROCESSING THEM

CROSS REFERENCE TO RELATED APPLICATION

This application is the US national phase of PCT application PCT/RO2004/000008 filed 5 Apr. 2004 with a claim to the priority of Romanian patent application a2003-00519 itself filed 13 Jun. 2003.

This invention is about substances to stimulate the extraction of crude oils, especially the ponderous and paraffin one, not clogging the route and the abutting deposits of the oil derrick by changing the deposit's reology and also about solubility of the aggregates which were made from paraffin resins on the oil derrick's circulation route, using a similar chemical vector to the podrugs from the medicine industry.

There are substances which are destined not to clog the extraction pipe that are especially formed by three types:
  water detergents emulsions
  refined oil solvents
  substances which were obtained by coke's distilling It is already known that crude oil has an advanced composition (from easily volatile fraction, solvents, gasoline, to the by paraffin's and asphaltenes which are known, by the generic name, as "Godeville wax").

Working with the oil-derrick generates local changes of pressures and different temperature sections, enough to form local deposes and, also, final opturates, which are made to stop or to burden the fluid phase's circulation on the crude oil by the circulation tubes (columns and tubing).

An increase in thickness of the crude oil is also producing in the deposit, in the abutting area, around the oil-derrick and that come in the long run from the extraction of the fluid phase; the thickness of the stratum is from 10-15 cm to 1-2 m and is made from paraffin systems of swarms which are narrowing the afflux of the fluid phase to the oil-derrick's pomp. There are processes and methods already known, that lead to the diminishing of these effects by using some chemical solvents solutions or watery detergents solutions which allow the liquefaction of the area abutting the oil-derrick and facilitate the leaking of the fluid phase.

The chemical-solutions which-use organic solvents are disadvantaged by the fact that they have 0.6-0.8 gr/cm$^3$ density and that leads to the fact that, being set free from the oil-derrick's perforations in the abutting area, they grow to the higher part, meaning that not perforating area of the oil-derrick, and they are not activate in the working area.

Watery detergents solutions act by flowing out, down the deposit, having 1 gr/cm density (higher than the crude oil's density), only that, these new created intern faces are not covered by a blister and paraffin are just as much active as others, so they complete the paraffin swarms, after the watery detergent solutions passing by.

On the other half, the water that was let in maintains itself neutral and this is not to be found like useful fraction in the extraction, meanwhile the coal oil, that was propose as chemical vector in order to form the solutions, can be processed in refineries and that way it improves the distilled one by cyclical valuable fractions.

So, because of the coal oil's condensed cycles failure, it can reach to ecological gasoline, which has an octane number that was been grown up directly from the refinery, if the oil percent that brings the crude oil in the refinery had been corrected.

This invention solves a technical problem: to perform a new composition for stimulating the oil extraction, which is build by fractions from the distilled coals, improved by solvents, detergents, acids, alkali, generating salts like ammonium salts and all of them have a superior effect in stimulating the extracting and improving the flowing reology.

That invention has a special ecological compound meaning that it proposes an excellent method for processing and extending (expanding) of some pollution substances which are very intense, like naphthalene, anthracene and, also, other creosols, by their extinction into the oil deposit and by changing them in useful compounds, using "in situ" reactions.

Any draining technology of those polluting substances on the Earth face is so much more polluting than the extinction into the oil deposit, without some other material or energetically consuming.

The oil that had been chosen is composed by the combination of coke-oven coal's distilled fractions, according to this invention, must have 1.15-1.17 gr/cmc density in order to be a perfect vector for the already formed solutions. This means that the creosote or impregnation oil's fractions may be chosen, but this choice refers also to the polymerized oil, so that their mixture must discharge the chemical vector condition.

The main substances, which was build as a chemical vector, is formed by three fractions, obtained from the coke oven distilled coal oil, just the way they were defined by STAS 3261/87 and presented from the boiling point's point of view the typical weight and most chemical composition, already being known that by industrial distillation can be produced such mixtures:

1 fraction-is composed from what is called (technical name) "phenol oil"; it has 170-190° C. as distillation maximum and minimum, 1.15-1.2 g/cm$^3$ density and it contains, in the first place, creosol, naphthalene and anthracene with some free radicals, all by the main formula;

2 fraction-is composed from what is called (technical name) "absorption oil" (by STAS 3362); it has 250-270° C. as distillation maximum and minimum, 1.19-1.122 g/cm$^3$ density and it also contains phenanthene, fluorene, carbazole, fluoranthene;

3 fraction-that is also called (technical name) "polymerized oil"; it has 320-350° C. as distillation maximum and minimum, 1.20-1.23 g/cm$^3$ density and it is chemically composed from acenaphthene and christen;

That composition, composed from 30% from 1 fraction solution-phenol oil mixed with 30% from 2 fraction-absorption oil and all mixed with 30% from 3 fraction, that is also called (technical name) "polymerized oil" is, in fact, the main solution named "chemical vector", completed by another supplement of 10% meaning types of substances brought from outside the distillation process and called "the vector's charging"

The major chemical substance, so it was called as "chemical vector", contains numerous substances which can be characterized as very intense pollution compounds and it comes from the coal distillated substances and has the generic name of "mineral coal oil", according to the invention. The chemically compound of the mineral coal oil is very opened wide and it depends on the processed coal's quality and on the coke-oven technology of the producing factory. By taking over the chemical analyses from more mineral coal oil gorge and ignoring the compounds which have a under 2% weight, we can learn that the following one are really important:

| Gas Analysis: | |
| --- | --- |
| compound | weight |
| naphthalene | 10-14% |
| acenaphthene | 8-10% |
| fluorene | 16-20% |
| fluoranthene | 8-9% |
| pyrene | 10-12% |
| antracen | 8-12% |

Each fraction has an important role in the physical and chemical behavior of the chemical vector comparing the crude oil and the paraffin systems that it contains.

phenol oil has an important role in penetrating the paraffin systems, is also a proper solvent and has a higher density than water has;

absorption oil creates inert areas that are incompatible (from the chemical point of view) with the paraffin systems, so these one are not pasting, just like in the solvents case. In crude oil, these are maintaining active areas between paraffin systems (paraffin swarms) which are reuniting them by increasing the paraffin swarm the generating gas substances, like the ammonium salts (sulfate and carbonate), which must decompose under 70° C., gas that will radically change the reology of crude oil leaking detergents and tension active substances which (by 2% of the volume or 20% of the chemical charging total) will stabilize the new reology route and will improve the leaking of the paraffin systems, also separating them from the inorganic stage.

The processing structure is formed by the chemical vector (a mixture from the three oils, in a 1:1:1:percent), chemically charged with a 10% plus per volume for solvents, detergents and gas generating substances, and must have, in the end a 1.10-1.12 g/cm$^3$ density.

According to this invention, the treating process refers to the fact that the structure is liable to pressure, in fact, under the extraction tubes, which are blocked down, or in the deposit, even if the flowing flux had been seriously decreased, until it reached a level of pression like 70-80 bars (which is the highest value of the tubes pression/column/tubing, and in that case in which the unlocking is not the very suitable, the pression must be conserved for 4-8 hours and the treatment should be done again, if a major decrease of the pressure is not registered, which would mean that the circuit is unblocked. According to the invention, the structure and the process have the following advantage:

it had been used a solution which can pass by a useful material inside the refinery process;

the high efficiency because its chemical vector character which was constituted when the mixture was formed;

the solution is accessible and using it meaning a medium security aspect because the oil is not used on the land surface, where can appear major pollution effects;

the reduction of the intervention rhythm at the oil-derricks because a longer time for proceeding solution;

there is no need for special equipment for making the treatments;

it has no uncalled secondary effects (metallic corrosion or a emulsifying of the valuable constituents) from crude oil;

from the oil solution used in injection at the refinery are obtained gasoline with a higher octane number and semicircular coke.

According the invention, here is an example for making a substance and also one for making the processing:

EXAMPLE NR. 1

The substance of the treatment network which uses equipment for the stratum technological injection and also the one that is used for broaching the column network has the following volume percent:

30% phenol oil from the first fraction
30%/volum absorption oil
20% polymerized oil
20% ammonium carbonate
etoxiled noniphenol with 5 to 9 grouping etoxys in a 5% percent
3% phenol At the oil-derrick, which have a low afflux and, also, are presenting a blocking because of the paraffin deposes which exist on the perforating level or on the column's tubes, a unblocking treatment must be done, by using the solution that was presented before, on a percent of 5 mc/solution/perforated meter or, in other case, like blocking the columns to a maximum pressure limited by the tube material 70-90 bars until the route is unblocked. If a improved circulation is not noticed after 5-8 hours, the solution must be taking out by scavenging into the hub and the treatment must be restored until the oil-derrick is efficiently unblocked.

Using a lab analyze, other type of coal oils can be chosen, from their distilling, but only if the typical density passes over 1.08, and the formed vector charges with reactive (solvents, detergents, etc), by the initial purpose and by the characteristics of the deposit.

The invention claimed is:

1. A composition for treating crude oils to improve flow and to facilitate extraction from oil wells, which comprises:
   (a) 20 to 30% by volume of a phenolic oil which is a distillation fraction having a distillation temperature range from 170 to 190° C.;
   (b) 20 to 40% by volume of an absorption oil, which is a distillation fraction having a distillation temperature range from 250 to 270° C.;
   (c) 20 to 40% by volume of a polymerization oil which is a distillation fraction having a distillation temperature range from 320 to 350° C.; and
   (d) balance of the composition up to 100% by volume of a mixture of chemical additives containing a surfactant, a gas generator, an acidic substance, and a solvent, the density of the composition being 1.10 to 1.12 g/cm$^3$.

2. The composition for treating crude oil defined in claim 1 wherein the volumetric ratio of the phenolic oil, the absorption oil, and the polymerization oil is 1:1:1.

3. The composition for treating crude oil defined in claim 1 wherein the phenolic oil comprises cresols, naphthalenes, and anthracenes with various chemical radicals attached thereto and having a density of 1.15 to 1.20 g/cm$^3$; the absorption oil comprises phenanthrene, fluorene, carbosols, and fluoranthrene and having a density of 1.19 to 1.22 g/cm$^3$, and the polymerization oil comprises pyrene, acenaphthenes, and chrysenes, and having a density of 1.20 to 1.23 g/cm$^3$.

4. The composition for treating crude oil defined in claim 1 wherein the mixture of chemical additives consists of 25% by weight of a surfactant, 10% by weight of a gas generating substance, which are decomposed at a temperature less than 70° C. causing the generation of gases, 15% by weight of an acidic substance, and the balance solvent to 100%.

5. The composition for treating crude oil defined in claim 1 which comprises 30% by volume of a phenolic oil, 30% by volume of an absorption oil, 20% by volume of a polymerization oil, and 20% by volume of a mixture of chemical additives comprising 10% by weight of ammonium carbonate, 25% by weight of nonylphenol ethoxylated with 5 to 9 ethoxy groups 15% by weight of phenol, and the balance a solvent up to 100%.

6. A process for treating crude oils to improve flow and to facilitate extraction from an oil well by preventing formation of deposits clogging oil derricks used in the extraction of the crude oils, which comprises the steps of:
  (i) injecting a composition which comprises
    (a) 20 to 30% by volume of a phenolic oil which is a distillation fraction having a distillation temperature range from 170 to 190° C.;
    (b) 20 to 40% by volume of an absorption oil, which is a distillation fraction having a distillation temperature range from 250 to 270° C.;
    (c) 20 to 40% by volume of a polymerization oil which is a distillation fraction having a distillation temperature range from 320 to 350° C.; and
    (d) balance of the composition up to 100% by volume of a mixture of chemical additives containing a surfactant, a gas generator, an acidic substance, and a solvent, the density of the composition being 1.10 to 1.12 g/cm$^3$;
  under pressure into a tubing or through a production casing for crude oil extraction through the oil well;
  ii (ii) ceasing fluid extraction from the oil well through the tubing or the production casing into which the composition according to step (i) has been injected, for a period of 4 to 8 hours, to penetrate and open up the oil well; and
  (iii) following step (ii) resuming extraction of crude oil from the oil well.

7. The process for treating crude oils defined in claim 6 wherein an effective amount of the composition to prevent clogging of the oil derricks is injected according to step (i) to ensure a distribution of 5 m$^3$ of solution/meter through a perforated portion of the tubing portion.

8. The process for treating crude oils defined in claim 6 wherein following steps (ii) and (iii), if the crude oil extraction has not returned to a sufficient level, again injecting the composition according to step (i) into the tubing or through the production casing.

9. A process for treating crude oils to facilitate crude oil extraction from an oil well by preventing formation of deposits clogging lines leading from oil derricks used in the extraction of the crude oils, which comprises the steps of:
  (i) injecting a composition which comprises
    (a) 20 to 30% by volume of a phenolic oil which is a distillation fraction having a distillation temperature range from 170 to 190° C.;
    (b) 20 to 40% by volume of an absorption oil, which is a distillation fraction having a distillation temperature range from 250 to 270° C.;
    (c) 20 to 40% by volume of a polymerization oil which is a distillation fraction having a distillation temperature range from 320 to 350° C.; and
    (d) balance of the composition up to 100by volume of a mixture of chemical additives containing a surfactant, a gas generator, an acidic substance, and a solvent, the density of the composition being 1.10 to 1.12 g/cm$^3$, through a line for conveying the crude oil, extracted from an oil well, and in the case of a line whose flow there through is blocked, employing a maximum pressure value which is limited by the pressure that the tubing can withstand;
  (ii) maintaining the pressure within the line for a period of 4 to 8 hours; and
  (iii) following step (ii), resuming the flow of crude oil through the line from the oil well.

10. The process for treating crude oils defined in claim 9 wherein following steps (ii) and (iii), if the crude oil flow through the line has not returned to a sufficient level, again injecting the composition according to step (i) into the line for conveying the crude oil.

* * * * *